United States Patent
Jun

(10) Patent No.: US 8,046,595 B2
(45) Date of Patent: Oct. 25, 2011

(54) METHOD OF CONTROLLING OPERATING CLOCK FREQUENCY OF HARD DISK DRIVE, RECORDING MEDIUM, AND HARD DISK DRIVE

(75) Inventor: Jin-Wan Jun, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1270 days.

(21) Appl. No.: 11/581,330

(22) Filed: Oct. 17, 2006

(65) Prior Publication Data

US 2007/0255967 A1 Nov. 1, 2007

(30) Foreign Application Priority Data

Apr. 26, 2006 (KR) .................. 10-2006-0037708

(51) Int. Cl.
*G06F 1/26* (2006.01)
(52) U.S. Cl. ........ 713/300; 713/310; 713/320; 713/321; 713/322; 713/323; 713/324; 713/330; 713/340
(58) Field of Classification Search .................. 713/300, 713/310, 320–324, 330, 340
See application file for complete search history.

(56) References Cited

U.S. PATENT DOCUMENTS

| | | | | |
|---|---|---|---|---|
| 5,682,273 A * | 10/1997 | Hetzler | ........................... | 360/75 |
| 6,754,837 B1 * | 6/2004 | Helms | ........................... | 713/322 |
| 7,072,138 B2 * | 7/2006 | Schmidt | ..................... | 360/78.04 |
| 2002/0174312 A1 * | 11/2002 | Ikeda et al. | .................... | 711/167 |
| 2004/0125498 A1 * | 7/2004 | Schmidt | ..................... | 360/78.04 |
| 2004/0128575 A1 * | 7/2004 | Schmidt | ..................... | 713/322 |
| 2005/0120144 A1 * | 6/2005 | Koyama | ........................... | 710/8 |
| 2005/0144378 A1 * | 6/2005 | Grover | ........................... | 711/113 |
| 2005/0144491 A1 * | 6/2005 | Zayas | ........................... | 713/300 |
| 2005/0160221 A1 * | 7/2005 | Yamazaki et al. | ............ | 711/114 |
| 2006/0209444 A1 * | 9/2006 | Song et al. | ..................... | 360/31 |
| 2007/0073970 A1 * | 3/2007 | Yamazaki et al. | ............ | 711/114 |

FOREIGN PATENT DOCUMENTS

| | | |
|---|---|---|
| JP | 2004-164830 | 6/2004 |
| JP | 2005-31729 | 2/2005 |
| KR | 2001-4774 | 1/2001 |
| KR | 2001-101838 | 11/2001 |
| KR | 2003-9296 | 1/2003 |

OTHER PUBLICATIONS

Korean Office Action dated Mar. 23, 2007 issued in KR 2006-37708.

* cited by examiner

*Primary Examiner* — M Elamin
(74) *Attorney, Agent, or Firm* — Stanzione & Kim, LLP

(57) ABSTRACT

A method and apparatus to control an operating clock frequency of a hard disk drive. The method includes analyzing a command workload, and changing the operating clock frequency of the hard disk drive based on an analysis result. Alternatively, the method includes measuring a time taken to receive a predetermined number of write/read commands and controlling the operating clock frequency of the hard disk drive based on a result of a comparison of the measured time with at least one reference value. An operating clock frequency control block included in the hard disk drive executes the method.

25 Claims, 4 Drawing Sheets

METHOD OF CONTROLLING OPERATING CLOCK FREQUENCY OF HARD DISK DRIVE, RECORDING MEDIUM, AND HARD DISK DRIVE

CROSS-REFERENCE TO RELATED APPLICATIONS

This application claims priority under 35 U.S.C. §119 from Korean Patent Application No. 10-2006-0037708, filed on Apr. 26, 2006, the disclosure of which is hereby incorporated by reference in its entirety.

BACKGROUND OF THE INVENTION

1. Field of the Invention

The present general inventive concept relates to a system to control an operating clock frequency of a hard disk drive, and more particularly, to a method of adaptively controlling an operating clock frequency of a hard disk drive according to an operating environment of the hard disk drive by analyzing a command workload, a recording medium to record the method, and a hard disk drive using the method.

2. Description of the Related Art

Performance of hard disk drives increases in proportion to an operating clock frequency. However, when the operating clock frequency is increased to increase the performance of a hard disk drive, power consumption of the hard disk drive is also increased.

A low operating clock frequency is usually used in mobile drives to decrease power consumption. However, high performance of a drive may be required depending on an environment in which the drive is used. In some instances, low power consumption may be more desirable than high performance. For example, when a quantity of command workload is large like in a compiling or rendering operation, the high performance of a hard disk drive is required, and therefore, the hard disk drive needs to be operated at a high operating clock frequency. On the other hand, when the hard disk drive is used to see movies, the low power consumption takes precedence over the performance, and therefore, the hard disk drive needs to be operated at the low operating clock frequency.

A command workload indicates a total number of write/read commands received by a hard disk drive during a predetermined reference time. Accordingly, when an amount of operation increases in the hard disk drive, the command workload also increases.

As described above, priority between high performance and low power consumption in a hard disk drive may change according to an operating environment of the hard disk drive. Accordingly, when the operating clock frequency of the hard disk drive is fixed, the hard disk drive cannot be used efficiently in various operating environments.

SUMMARY OF THE INVENTION

The present general inventive concept provides a method of controlling an operating clock frequency of a hard disk drive based on a result of analyzing a command workload to adaptively operate the hard disk drive according to an operating environment, a recording medium to record the method, and a hard disk drive using the method.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a method of controlling an operating clock frequency of a hard disk drive, the method including a command workload analyzing operation and an operating clock frequency changing operation.

In a command workload analyzing operation, a total number of write/read commands received during a predetermined reference time may be analyzed (or counted). In the operating clock frequency changing operation, the operating clock frequency of the hard disk drive may be changed or maintained based on an analysis result. The command workload may be compared with at least one reference value, and a mode corresponding to a comparison result may be set.

When a mode set in advance is different from the mode currently set based on the comparison result, an operating clock frequency corresponding to the mode set in advance may be changed into a second operating clock frequency corresponding to the currently set mode. When the operating clock frequency of the hard disk drive is changed, at least one external interrupt may be disabled until the operating clock frequency of the hard disk drive is changed completely.

The foregoing and/or other aspects of the present general inventive concept may also be achieved by providing a method of controlling an operating clock frequency of a hard disk drive, the method including a time measuring operation and an operating clock frequency changing operation.

In the time measuring operation, a time taken to receive a predetermined number of write/read commands may be measured. In the operating clock frequency changing operation, the measured time may be compared with at least one reference value and a mode based on the comparison result may be set. When a mode set in advance is different from the mode currently set based on the comparison result, an operating clock frequency corresponding to the mode set in advance is changed into a second operating clock frequency corresponding to the currently set mode.

The foregoing and/or other aspects of the present general inventive concept may also be achieved by providing a method of controlling an operating clock frequency of a hard disk drive, the method including changing an operating clock frequency of a hard disk drive to another operating clock frequency according to at least one of a command workload, a mode to operate the hard disk drive, and a time taken to receive one or more commands.

The foregoing and/or other aspects of the present general inventive concept may also be achieved by providing a computer-readable recording medium having embodied thereon a computer program to execute a method of controlling an operating clock frequency of a hard disk drive, the method including analyzing a command workload, and changing an operating clock frequency of a hard disk drive according to the analyzed command workload.

The foregoing and/or other aspects of the present general inventive concept may also be achieved by providing a computer-readable recording medium having embodied thereon a computer program to execute a method of controlling an operating clock frequency of a hard disk drive, the method including generating a command workload, comparing the command workload with at least one reference value and setting a mode according to the comparison, and when a mode set in advance is different from the mode currently set according to the comparison, changing an operating clock frequency corresponding to the mode set in advance into a second operating clock frequency corresponding to the currently set mode.

The foregoing and/or other aspects of the present general inventive concept may also be achieved by providing a computer-readable recording medium having embodied thereon a computer program to execute a method of controlling an operating clock frequency of a hard disk drive, the method including measuring a time taken to receive a predetermined number of write/read commands, comparing the measured time with at least one reference value and setting a mode based on a comparison result, and when a mode set in advance is different from a mode currently set based on the comparison result, changing an operating clock frequency corresponding to the mode set in advance into a second operating clock frequency corresponding to the currently set mode.

The foregoing and/or other aspects of the present general inventive concept may also be achieved by providing a computer-readable recording medium having embodied thereon a computer program to execute a method of controlling an operating clock frequency of a hard disk drive, the method including changing an operating clock frequency of a hard disk drive to another operating clock frequency according to at least one of a command workload, a mode to operate the hard disk drive, and a time taken to receive one or more commands.

The foregoing and/or other aspects of the present general inventive concept may also be achieved by providing a hard disk drive including a host interface unit and an operating clock frequency control block. The hard disk drive communicates with a host through the host interface unit.

The operating clock frequency control block may analyze a command workload based on at least one command input through the host interface unit, may control an operating clock frequency of the hard disk drive based on an analysis result, and may output a controlled operating clock frequency.

The operating clock frequency control block may set a mode based on a result of a comparison of the analyzed command workload with at least one reference value. Alternatively, the operating clock frequency control block may measure a time taken to receive a predetermined number of write/read commands, compare the measured time with at least one reference value, and set the mode corresponding to the comparison result.

When a mode set in advance is different from the mode currently set based on the comparison result, the operating clock frequency control block may change an operating clock frequency corresponding to the mode set in advance into a second operating clock frequency corresponding to the currently set mode.

The foregoing and/or other aspects of the present general inventive concept may also be achieved by providing a hard disk drive including an operating clock frequency control unit to change an operating clock frequency of a hard disk drive to another operating clock frequency according to at least one of a command workload, a mode to operate the hard disk drive, and a time taken to receive one or more commands.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
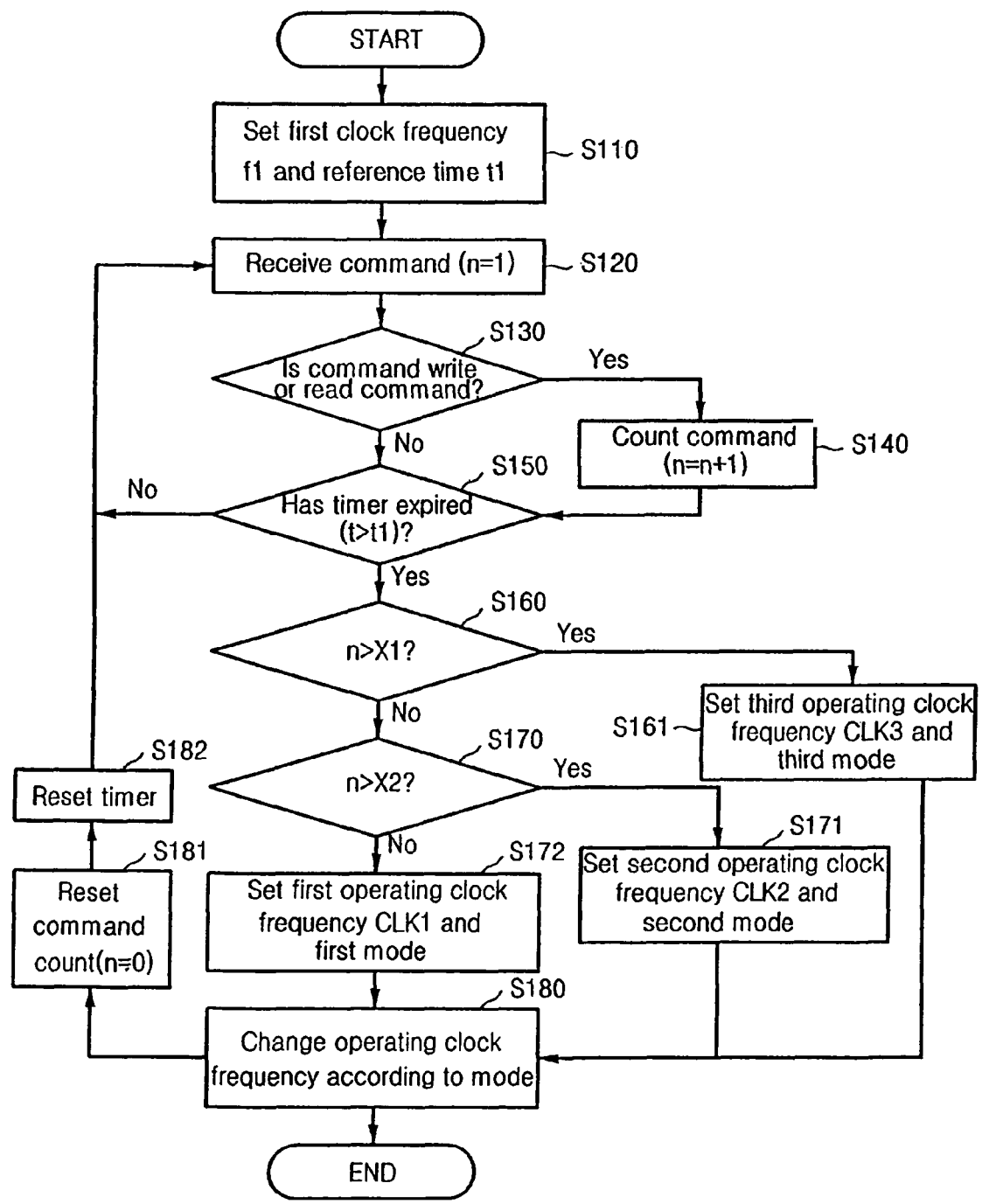
FIG. 1 is a flowchart illustrating a method of controlling an operating clock frequency of a hard disk drive according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a flowchart illustrating a method of controlling an operating clock frequency of a hard disk drive according to an embodiment of the present general inventive concept. In operation S110, a first clock frequency f1 and a reference time t1 are set in the hard disk drive. Information on the first clock frequency f1 and the reference time t1 may be stored in a predetermined data storage unit (for example, a register) within the hard disk drive or may be stored in software. In this case, the hard disk drive operates at the first clock frequency f1. The reference time t1 may be set in a predetermined time unit, for example, 30 seconds or 1 minute. Expiration of the reference time t1 may be checked using a timer.

In operation S120, the hard disk drive receives a command from a host, e.g., a personal computer (PC). In operation S130, the hard disk drive determines whether the command is a write command or a read command. When the command is the write command or the read command, the hard disk drive counts the command as one of a number of input commands, i.e., a command count "n" in operation S140. If the command is neither the write command nor the read command, the hard disk drive does not count the command.

If it is determined that the reference time t1 has not expired in operation S150, operations S120 and S130 or operations S120, S130, and S140 are repeated. A time taken from the receipt of the write or read command is compared with the reference time t1 so as to determine whether the reference time t1 is expired. If it is determined that the reference time t1 has expired in operation S150, the hard disk drive compares the command count "n" with a first reference value X1 in operation S160.

When the command count "n" is greater than the first reference value X1, i.e., n>X1, an operating clock frequency of the hard disk drive is set at a third operating clock frequency CLK3, and a third mode is set (or referred to as "a third mode"), in operation S161. Thus, the first clock frequency f1 is changed to the third operating clock frequency CLK3 in operation S180. When the command count "n" is greater than the first reference value X1 during the reference time t1, the hard disk drive has been in an operating environment requiring frequent data input/output. Accordingly, the hard disk drive will be operated at a high operating clock frequency, i.e., the third operating clock frequency CLK3 to increase a performance thereof. Therefore, operation S160 may be performed after the operation S140 and before operation S150 to determine whether the command count "n" is greater than the first reference value x1. If n>x1, S161 is performed. If n<x1, S150 is performed. The operations S160 and S161 may be performed when it is determined that t<t1 in operation S150.

When the command count "n" is less than or equal to the first reference value X1 and is greater than a second reference value X2, i.e., X2<n≦X1 in operation S170, the operating clock frequency of the hard disk drive is set at a second operating clock frequency CLK2 (where CLK2<CLK3) and a second mode is set (or referred to as "a second mode"), in operation S171. When the command count "n" is less than or equal to the first reference value X1 and is greater than the second reference value X2, the hard disk drive will be operated at the second operating clock frequency CLK2 which is proper in terms of both performance and power consumption. The second operating clock frequency CLK2 may correspond to the first clock frequency f1 (i.e., CLK2=f1) and may be a default operating clock frequency.

When the command count "n" is less than or equal to the second reference value X2, i.e., n≦X2 in operation S170, the operating clock frequency of the hard disk drive is set at a first operating clock frequency CLK1 (where CLK1<CLK2) and a first mode is set (or referred to as "a first mode"), in operation S172. When the command count "n" is less than or equal to the second reference value X2, the hard disk drive has been in an operating environment requiring a small number of data inputs/outputs. Accordingly, the hard disk drive will be operated at the first operating clock frequency CLK1 to decrease a power consumption thereof.

In operation S180, the operating clock frequency of the hard disk drive is changed into an operating clock frequency (e.g., the first operating clock frequency CLK1) corresponding to a mode (e.g., the first mode) set through operations S160, S161, S170, S171, and S172. After the change or a non-change of the operating clock frequency is completed, the command count "n" is reset in operation S181 and a timer is reset in operation S182.

Figure 2:
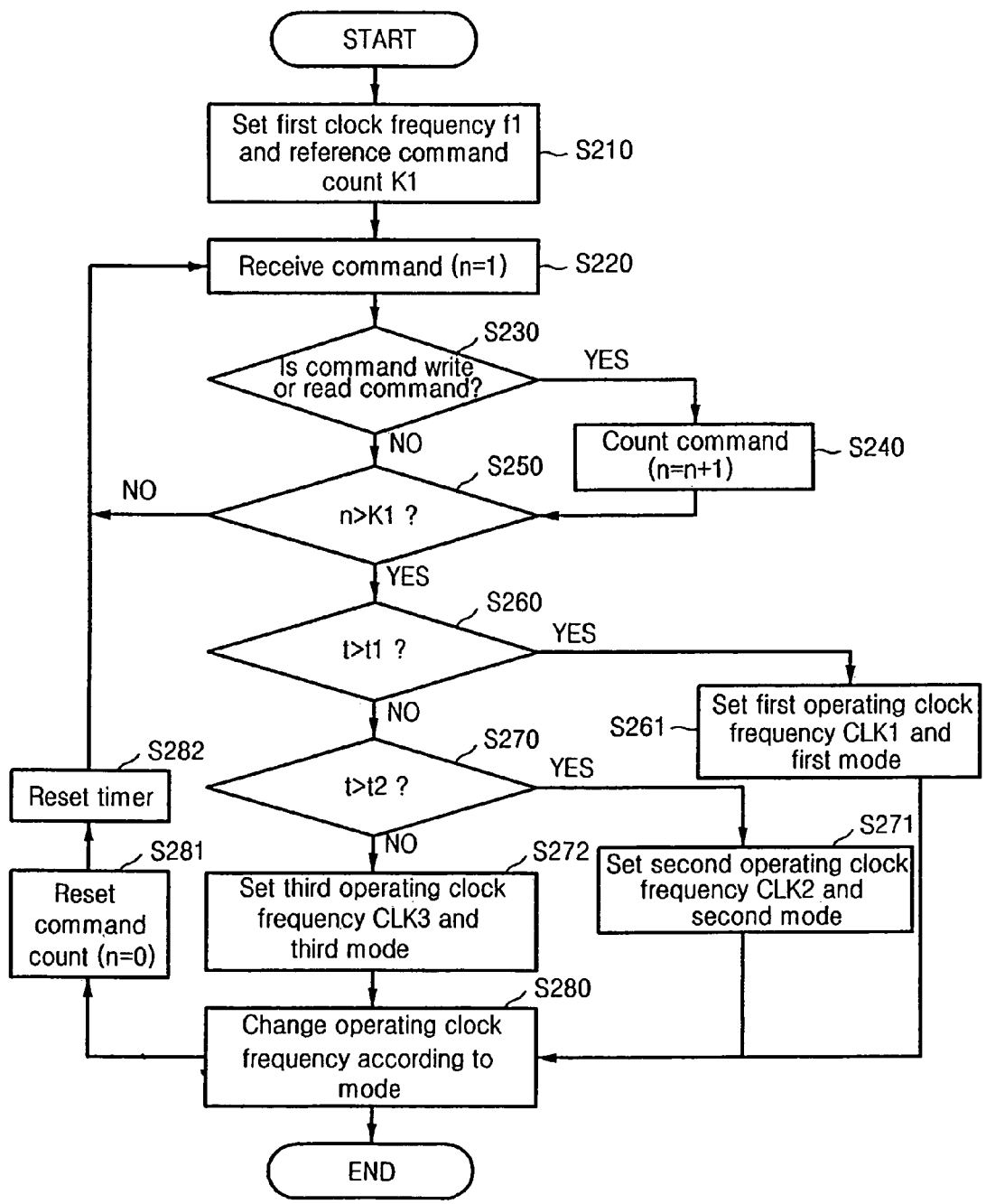
FIG. 2 is a flowchart illustrating a method of controlling an operating clock frequency of a hard disk drive according to another embodiment of the present general inventive concept.

FIG. 2 is a flowchart illustrating a method of controlling an operating clock frequency of a hard disk drive according to another embodiment of the present general inventive concept. In operation S210, a first clock frequency f1 and a reference command count K1 are set in the hard disk drive. Then, the hard disk drive operates at a first clock frequency f1. The reference command count K1 may be set in a predetermined count unit, for example, K1 may be set to be equal to 1000. Whether the reference command count K1 is exceeded may be checked using a predetermined command counter.

In operation S220, the hard disk drive receives a command from a host, e.g., a PC. In operation S230, the hard disk drive determines whether the command is a write command or a read command. When the command is the write command or the read command, the hard disk drive counts the command as a number of input commands, i.e., a command count "n" in operation S240. If the command is neither the write command nor the read command, the hard disk drive does not count the command.

If it is determined that the command count "n" does not exceed a reference command count K1 in operation S250, operations S220, S230, and S240 are repeated and a time "t" taken until the command count "n" exceeds the reference command count K1 is measured. The time "t" may be measured using a timer.

If it is determined that the command count "n" exceeds the reference command count K1, i.e., n>K1 in operation S250, the time "t" taken to reach the command count "n" is compared with a first reference value t1 in operation S260.

When the time "t" is greater than the first reference value t1, i.e., t>t1, the operating clock frequency of the hard disk drive is set at a first operating clock frequency CLK1 and a first mode is set (or referred to as "a first mode"), in operation S261. When the time "t" taken to receive as many write/read commands as the reference command count K1 is greater than the first reference value t1, the hard disk drive has been in an operating environment requiring a small number of data inputs/outputs. Accordingly, the hard disk drive will be operated at the first operating clock frequency CLK1 to decrease a power consumption thereof.

When the time "t" taken to receive as many write/read commands as the reference command count K1 is less than or equal to the first reference value t1 and is greater than a second reference value t2, i.e., t2<t≦t1 in operation S270, the operating clock frequency of the hard disk drive is set at a second operating clock frequency CLK2 (where CLK1<CLK2) and a second mode is set (or referred to as "a second mode"), in operation S271. When the time "t" is less than or equal to the first reference value t1 and is greater than the second reference value t2, the hard disk drive will be operated at the second operating clock frequency CLK2 which is proper in terms of both performance and power consumption. The second operating clock frequency CLK2 may correspond to the first clock frequency f1 (i.e., CLK2=f1) and may be a default operating clock frequency.

When the time "t" taken to receive as many write/read commands as the reference command count K1 is less than or equal to the second reference value t2, i.e., t≦t2 in operation S270, the operating clock frequency of the hard disk drive is set at a third operating clock frequency CLK3 (where CLK2<CLK3) and a third mode is set (or referred to as "a third mode"), in operation S272. When the time "t" is less than or equal to the second reference value t2, the hard disk drive has been in an operating environment requiring frequent data input/output. Accordingly, the hard disk drive will be operated at a high operating clock frequency, i.e., the third operating clock frequency CLK3 to increase a performance thereof.

In operation S280, the operating clock frequency of the hard disk drive is changed into an operating clock frequency (e.g., the first operating clock frequency CLK1) corresponding to a mode (e.g., the first mode) set through operations S260, S261, S270, S271, and S272. After the change or a non-change of the operating clock frequency is completed, the command count "n" is initialized in operation S281 and a timer is initialized in operation S282.

Figure 3:
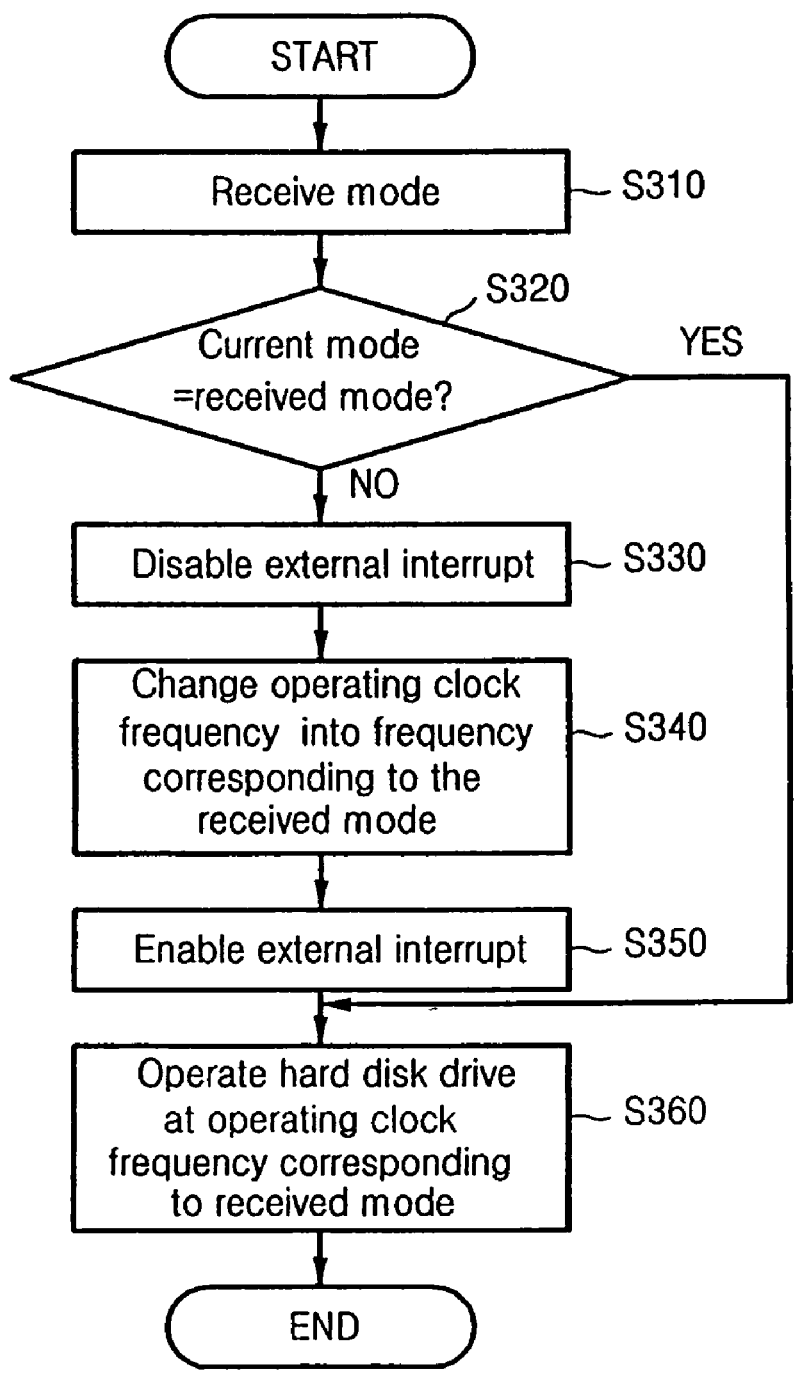
FIG. 3 is a flowchart illustrating a procedure to change an operating clock frequency in accordance with a current mode, according to an embodiment of the present general inventive concept.

FIG. 3 is a flowchart illustrating a method to change an operating clock frequency of a current mode of a hard disk drive, according to an embodiment of the present general inventive concept. Referring to FIGS. 1, 2, and 3, a mode (specifically a signal-indicating the mode, e.g., a first mode) set in the method illustrated in FIG. 1 or 2 is received in operation S310. The hard disk drive compares the current mode or the signal indicating the current mode (e.g., a second mode), which has been set in advance, with a received mode or a signal indicating the received mode (e.g., the first mode) in operation S320. The received mode may be transmitted from a PC or a memory device.

When the current mode is not the same as the received mode, the hard disk drive disables an external interrupt in operation S330 if there is any external interrupt.

In operation S340, an operating clock frequency (e.g., CLK2) corresponding to the current mode (e.g., the second mode) is changed into an operating clock frequency (e.g., CLK1) corresponding to the received mode (e.g., the first mode). In operation S350, after the change of the operating clock frequency is completed, the external interrupt is enabled. In operation S360, the hard disk drive operates in response to the changed-operating clock frequency (CLK1). For example, when the current mode is the second mode and the received mode is a third mode, the external interrupt is disabled and a second operating clock frequency CLK2 of the hard disk drive is changed into a third operating clock frequency CLK3 corresponding to the third mode.

When the current mode is the same as the received mode, the operating clock frequency of the hard disk drive is not changed in operation S360.

Figure 4:
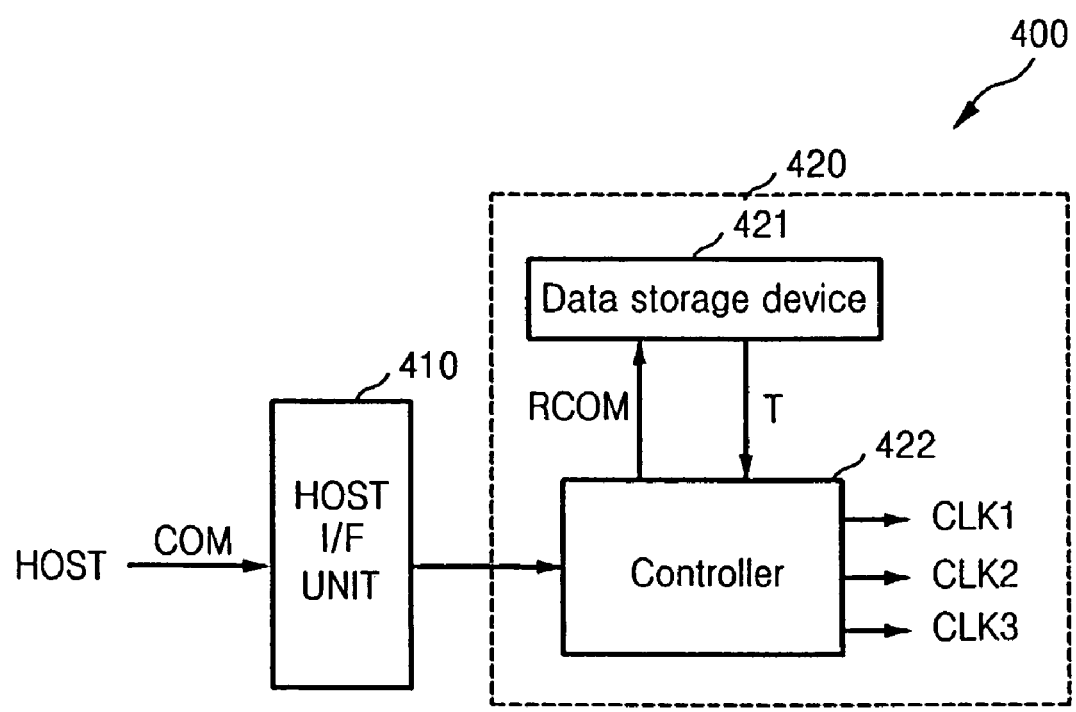
FIG. 4 illustrates a block diagram illustrating a hard disk drive to control an operating clock frequency according to an embodiment of the present general inventive concept.

FIG. 4 is a block diagram illustrating a hard disk drive 400 to control an operating clock frequency according to an embodiment of the present general inventive concept. The hard disk drive 400 includes constituent elements, such as a host interface unit 410 and an operating clock frequency control block 420.

The hard disk drive 400 communicates with a host through the host interface unit 410. The operating clock frequency control block 420 analyzes (or counts) a command workload based on at least one command COM (e.g., a write command or a read command) input through the host interface unit 410, controls (e.g., changes or maintains) an operating clock frequency of the hard disk drive based on an analysis (or a counting) result, and outputs a controlled operating clock frequency. The controlled operating clock frequency may be provided to a predetermined internal circuit operating in response to the operating clock frequency.

Although not illustrated in FIG. 4, other constituent elements of the hard disk drive, such as a plurality of disks, a plurality of heads, a preamplifier, a actuator, a read/write channel circuit, a spindle motor, a spindle motor driver, a voice coil motor, a voice coil motor driver, etc., are in general common and known to one of ordinary skill in the art of hard disk drives. Thus, detailed descriptions thereof will be omitted.

The operating clock frequency control block 420 compares a result of analyzing the command workload with at least one reference value and sets a mode corresponding to a comparison result. If a mode that has been set in advance is different from the mode set based on the comparison result, the operating clock frequency control block 420 changes an operating clock frequency corresponding to the mode set in advance into an operating clock frequency corresponding to a currently set mode. When an external interrupt is input, the operating clock frequency control block 420 disables the external interrupt before changing the operating clock frequency of the hard disk drive.

The operating clock frequency control block 420 may include a data storage device 421 and a controller 422. A program to set the operating clock frequency of the hard disk drive is recorded in the data storage device 421. The data storage device 421 may be implemented as a read-only memory (ROM) device or a flash memory device, but the present general inventive concept is not restricted thereto.

The data storage device 421 generates a predetermined signal T in response to a predetermined command RCOM output from the controller 422. The controller 422 executes a program to set the operating clock frequency, which is stored in the data storage device 421, in response to the predetermined signal T output from the data storage device 421 so that the operating clock frequency of the hard disk drive is changed.

For example, when there is not an external interrupt and the hard disk drive is operating at a first clock frequency (e.g., f1=CLK2), the first clock frequency CLK2 may be a default value set by the program.

When a result of counting write/read commands output from the host during a predetermined reference time is greater than a first reference value, the controller 422 changes the first clock frequency CLK2 into a third operating clock frequency CLK3. When the counting result is less than or equal to a second reference value, the controller 422 changes the first clock frequency CLK2 into a first operating clock frequency CLK1. When the counting result is less than or equal to the first reference value and is greater than the second reference value, the controller 422 may not change the first clock frequency CLK2.

Alternatively, the operating clock frequency control block 420 may control the operating clock frequency of the hard disk drive as follows.

The operating clock frequency control block 420 measures a time taken to receive a predetermined number of write/read commands through the host interface unit 410, compares the measured time with at least one reference value, sets a mode corresponding to a comparison result, and if the mode that has been set in advance is different from the mode currently set based on the comparison result, and changes the operating clock frequency corresponding to the mode set in advance into the operating clock frequency corresponding to the currently set mode.

For example, the controller 422 included in the operating clock frequency control block 420 counts at least one of a write command or a read command received from the host and measures a time taken until a counted number reaches a predetermined reference command count. It is assumed that the hard disk drive is operating at the first clock frequency CLK2 corresponding to a second mode.

When the measured time is greater than the first reference value, the first clock frequency CLK2 is changed to the first operating clock frequency CLK1 (CLK1<CLK2) corresponding to a first mode of the hard disk drive. When the measured time is greater than the first reference value, the hard disk drive has been in an operating environment requiring a small number of data inputs/outputs. Accordingly, the operating clock frequency control block 420 changes the operating clock frequency of the hard disk drive to a low clock frequency, i.e., the first operating clock frequency CLK1, to decrease a power consumption of the hard disk drive.

The data storage device 421 and the controller 422 in the operating clock frequency control block 420 may operate in association with each other to control the operating clock frequency of the hard disk drive, but the present general inventive concept is not restricted thereto.

The above-described methods of controlling an operating clock frequency of a hard disk drive, can also be embodied as computer readable program codes on a computer readable recording medium. The computer readable recording medium is any data storage device that can store data which can be thereafter read by a computer system. Examples of the computer readable recording medium include read-only memory (ROM), flash memory, random-access memory (RAM), CD-ROMs, magnetic tapes, optical data storage devices, and carrier waves (such as data transmission through the internet).

The computer readable recording medium can also be distributed over network coupled computer systems so that the computer readable code is stored and executed in a distributed fashion. Also, functional programs, codes, and code segments to accomplish the present general inventive concept can be easily construed by programmers skilled in the art to which the present general inventive concept pertains. The methods illustrated in FIGS. 1, 2, and 3 can be stored in the computer-recorded medium in a form of computer-readable codes to perform the method when the computer reads the computer-readable codes of the recording medium.

As described above, according to the present general inventive concept, an operating clock frequency of a hard disk drive is controlled based on a result of analyzing a command workload which changes according to an operating environment of the hard disk drive so that a performance of the hard disk drive is improved or a power consumption thereof is reduced.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of controlling an operating clock frequency of a hard disk drive, the method comprising:
    setting a clock frequency of the hard disk drive and a command count;
    counting a command workload indicating a total number of write/read commands received by the hard disk drive;
    determining whether the command workload exceeds the command count;
    measuring a time taken for the command workload to exceed the command count;
    comparing the time taken to a plurality of reference times; and
    changing the operating clock frequency of the hard disk drive according to the time comparison.

2. The method of claim 1, wherein the changing of the operating clock frequency of the hard disk drive comprises:
    setting a mode of the hard disk drive according to the time comparison; and
    when the mode set in advance is different from a mode currently set according to the counted command workload, changing the operating clock frequency corresponding to the mode set in advance into a second operating clock frequency corresponding to the currently set mode.

3. The method of claim 2, further comprising:
    disabling at least one external interrupt until the operating clock frequency of the hard disk drive is changed completely.

4. A method of controlling an operating clock frequency of a hard disk drive, the method comprising:
    counting a command workload indicating a total number of write/read commands received by the hard disk drive;
    comparing the command workload with at least one reference value;
    measuring a time taken for the command workload to exceed the reference value;
    comparing the time taken to at least one reference time; and
    when a mode set in advance is different from the mode currently set according to the time comparison, changing the operating clock frequency corresponding to the mode set in advance into a second operating clock frequency corresponding to the currently set mode.

5. The method of claim 4, further comprising:
    disabling at least one external interrupt until the operating clock frequency of the hard disk drive is changed completely.

6. A method of controlling an operating clock frequency of a hard disk drive, the method comprising:
    measuring a time taken to receive a predetermined number of write/read commands;
    comparing the measured time with at least one reference value and setting a mode based on a comparison result; and
    when a mode set in advance is different from a mode currently set based on the comparison result, changing the operating clock frequency corresponding to the mode set in advance into a second operating clock frequency corresponding to the currently set mode.

7. The method of claim 6, further comprising:
    disabling at least one external interrupt until the operating clock frequency of the hard disk drive is changed completely.

8. A method of controlling an operating clock frequency of a hard disk drive, the method comprising:
    changing the operating clock frequency of the hard disk drive to another operating clock frequency according to at least one of a command workload, a mode to operate the hard disk drive, and a time taken to receive one or more commands,
    wherein the changing of the operating clock frequency comprises:
    counting a number of read or write commands as the command workload;
    comparing the counted number with a reference; and
    changing the operating clock frequency to first and second operating clock frequencies as the another operating clock frequency according to the counted number and the reference.

9. The method of claim 8, wherein the one or more commands comprises a predetermined number of commands, and the changing of the operating clock frequency comprises measuring the time taken to receive the predetermined number of commands, and changing of the operating clock frequency according to the time and a reference.

10. The method of claim 8, wherein:
    the mode comprises a pre-set mode and a received mode, and
    the changing of the operating clock frequency comprises changing of the operating clock frequency according to a difference between the pre-set mode and the received mode.

11. The method of claim 8, wherein the another operating clock frequency comprises first and second operating clock frequencies which are different from each other and from the operating clock frequency to increase and decrease performance when the hard disk drive operates at the operating clock frequency.

12. The method of claim 8, wherein the operating clock frequency corresponds to a reading or writing speed at which a disk of the hard disk drive is read or written.

13. The method of claim 8, wherein the operating clock frequency corresponds to a transmission speed at which data is read or written on a disk of the hard disk drive.

14. A computer-readable recording medium having embodied thereon a computer program to execute a method of controlling an operating clock frequency of a hard disk drive, the method comprising:
    setting a clock frequency of the hard disk drive and a command count;
    counting a command workload indicating a total number of write/read commands received by the hard disk drive;
    determining whether the command workload exceeds the command count;
    measuring a time taken for the command workload to exceed the command count;
    comparing the time taken to a plurality of reference times; and changing the operating clock frequency of the hard disk drive according to the time comparison.

15. A computer-readable recording medium having embodied thereon a computer program to execute a method of controlling an operating clock frequency of a hard disk drive, the method comprising:
   counting a command workload indicating a total number of write/read commands received by the hard disk drive;
   comparing the counted command workload with at least one reference value;
   measuring a time taken for the command workload to exceed the reference value;
   comparing the time taken to at least one reference time; and
   when a mode set in advance is different from the mode currently set according to the time comparison, changing the operating clock frequency corresponding to the mode set in advance into a second operating clock frequency corresponding to the currently set mode.

16. A computer-readable recording medium having embodied thereon a computer program to execute a method of controlling an operating clock frequency of a hard disk drive, the method comprising:
   measuring a time taken to receive a predetermined number of write/read commands;
   comparing the measured time with at least one reference value and setting a mode based on a comparison result; and
   when a mode set in advance is different from a mode currently set based on the comparison result, changing the operating clock frequency corresponding to the mode set in advance into a second operating clock frequency corresponding to the currently set mode.

17. A computer-readable recording medium having embodied thereon a computer program to execute a method of controlling an operating clock frequency of a hard disk drive, the method comprising:
   measuring a number of write/read commands received;
   comparing the number of write/read commands received with a reference value to produce a comparison result;
   measuring a time taken for the number of write/read commands to exceed the reference value;
   comparing the time taken to at least one reference time; and
   controlling the operating clock frequency of the hard disk drive based on the time comparison result.

18. A hard disk drive comprising:
   a host interface unit to communicate with a host; and
   an operating clock frequency control block to count a command workload based on at least one command input through the host interface unit indicating a total number of write/read commands received by the hard disk drive, to control an operating clock frequency of the hard disk drive based on a counting result, and to output a controlled operating clock frequency,
   wherein the operating clock frequency is controlled by comparing a time taken to reach the total number of write/read commands to at least one reference time.

19. The hard disk drive of claim 18, wherein the operating clock frequency control block compares the counted command workload with at least one reference value and sets a mode based on a comparison result, and when a mode set in advance is different from a mode currently set based on the comparison result, changes an operating clock frequency corresponding to the mode set in advance into the operating clock frequency corresponding to the currently set mode.

20. The hard disk drive of claim 18, wherein the operating clock frequency control block disables at least one external interrupt until the operating clock frequency of the hard disk drive is changed completely.

21. A hard disk drive comprising:
   a host interface unit to communicate with a host; and
   an operating clock frequency control block to measure a time taken to receive a predetermined number of write/read commands, to control an operating clock frequency of the hard disk drive based on a result of a comparison of the measured time with at least one reference value, and to output a controlled operating clock frequency.

22. The hard disk drive of claim 21, wherein the operating clock frequency control block sets a mode based on the result of comparing the measured time with the at least one reference value, and when a mode set in advance is different from a mode currently set based on the comparison result, changes the operating clock frequency corresponding to the mode set in advance into an operating clock frequency corresponding to the currently set mode.

23. The hard disk drive of claim 21, wherein the operating clock frequency control block disables at least one external interrupt until the operating clock frequency of the hard disk drive is changed completely.

24. A hard disk drive comprising:
   an operating clock frequency control unit to change an operating clock frequency of a hard disk drive to another operating clock frequency according to at least one of a command workload, a mode to operate the hard disk drive, and a time taken to receive one or more commands,
   wherein the operating clock frequency control unit includes:
   counting a number of read or write commands as the command workload;
   comparing the counted number with a reference; and
   changing the operating clock frequency to first and second operating clock frequencies as the another operating clock frequency according to the counted number and the reference.

25. The hard disk drive of claim 24, wherein the operating clock frequency and the another operating clock frequency are a same operating clock frequency.

* * * * *